(12) United States Patent
Zhan et al.

(10) Patent No.: US 6,858,173 B2
(45) Date of Patent: Feb. 22, 2005

(54) NANOCRYSTALLINE CERAMIC MATERIALS REINFORCED WITH SINGLE-WALL CARBON NANOTUBES

(75) Inventors: Guodong Zhan, Davis, CA (US); Amiya K. Mukherjee, Davis, CA (US); Joshua D. Kuntz, Lafayette, CA (US); Julin Wan, Schenectady, NY (US)

(73) Assignee: The Regents of the University of California, Oakland, CA (US)

( * ) Notice: Subject to any disclaimer, the term of this patent is extended or adjusted under 35 U.S.C. 154(b) by 53 days.

(21) Appl. No.: 10/356,729

(22) Filed: Jan. 30, 2003

(65) Prior Publication Data

US 2004/0150140 A1 Aug. 5, 2004

(51) Int. Cl.$^7$ ............................................. B29C 43/00
(52) U.S. Cl. ..................... 264/430; 264/434; 423/608; 423/610; 423/625; 423/635; 501/103; 501/108; 501/120; 501/127; 501/152
(58) Field of Search ................................. 264/430, 434

(56) References Cited

U.S. PATENT DOCUMENTS

| | | | | |
|---|---|---|---|---|
| 5,149,381 A | * | 9/1992 | Grewe et al. | 148/513 |
| 5,338,334 A | * | 8/1994 | Zhen et al. | 75/362 |
| 5,468,427 A | * | 11/1995 | Stangle et al. | 264/3.4 |
| 5,593,781 A | * | 1/1997 | Nass et al. | 428/403 |
| 5,660,774 A | * | 8/1997 | Stangle | 505/425 |
| 6,420,293 B1 | * | 7/2002 | Chang et al. | 501/95.2 |
| 6,471,930 B2 | * | 10/2002 | Kambe et al. | 423/335 |

* cited by examiner

*Primary Examiner*—Paul Marcantoni
(74) *Attorney, Agent, or Firm*—M. Henry Heines; Townsend and Townsend and Crew, LLP

(57) ABSTRACT

Composites of ceramic materials, notably alumina or metal oxides in general, with single-wall carbon nanotubes are consolidated by electric field-assisted sintering to achieve a fully dense material that has an unusually high fracture toughness compared to the ceramic alone, and also when compared to composites that contain multi-wall rather than single-wall carbon nanotubes, and when compared to composites that are sintered by methods that do not include exposure to an electric field.

9 Claims, 1 Drawing Sheet

NANOCRYSTALLINE CERAMIC MATERIALS REINFORCED WITH SINGLE-WALL CARBON NANOTUBES

STATEMENT AS TO RIGHTS TO INVENTIONS MADE UNDER FEDERALLY SPONSORED RESEARCH OR DEVELOPMENT

This invention was made with financial support from the United States Government under Contract No. DAAD19-00-1-0185, awarded by the United States Army Research Office. The Federal Government therefore has certain rights in this invention.

BACKGROUND OF THE INVENTION

1. Field of the Invention

This invention resides in the field of ceramics, and incorporates technologies relating to nanocrystalline materials, carbon nanotubes, and sintering methods for densification and property enhancement of materials.

2. Description of the Prior Art

Ceramics that have a microstructure consisting of nano-sized crystalline grains, i.e., grains that are less than 100 nm in diameter, are known to have unique properties that set these materials apart from ceramics with larger-grain microstructures. As a result, nanocrystalline ceramics hold promise as high-performance materials for a wide variety of applications extending from microelectromechanical devices (MEMS) to materials of construction for heat engines, cutting tools, wear and friction surfaces, and space vehicles. Fulfillment of the promise of nanocrystalline ceramics has been limited however by the brittleness of these materials.

Among the various attempts to reduce the brittleness of nanocrystalline ceramics, the most prominent have been the development of composites in which secondary materials are dispersed throughout the matrix ceramic material. In some of the more recent developments, carbon nanotubes, specifically multi-wall carbon nanotubes, have been used as the secondary material. A description of "ceramic matrix nanocomposites containing carbon nanotubes" is found in Chang, S., et al. (Rensselaer Polytechnic Institute), U.S. Pat. No. 6,420,293 B1, issued Jul. 16, 2002 on an application filed on Aug. 25, 2000. While the description encompasses both single-wall and multi-wall carbon nanotubes, the only carbon nanotubes for which test data is presented in the patent are multi-wall carbon nanotubes. The description in the patent of the sintering of the starting powders to form a dense continuous mass is limited to hot isostatic pressing.

Single-wall carbon nanotubes possess extraordinary electrical conductivity as well as a thermal conductivity that is twice that of diamond. Thus, when single-wall carbon nanotubes have been added to polymer matrices, the nanotubes have been shown to give the polymer an electrical conductivity high enough to provide an electrostatic discharge. Other extraordinary properties of single-wall carbon nanotubes are mechanical properties such as stiffness (a Young's modulus of 1,400 GPa) and strength (a tensile strength well above 100 GPa). While the electrical properties have been successfully exploited, the mechanical properties have not. Iron-alumina composites that include carbon nanotubes, for example, have demonstrated only marginally higher fracture strength than alumina alone and markedly lower than carbon-free iron-alumina composites. Nor has there been much improvement in fracture toughness. The best results reported to date are those of Siegel, R. W., et al., in *Scripta mater.* 44 (2001): 2061–2064, in which a 24% increase in fracture toughness of alumina was achieved by nanosized alumina filled with multi-wall carbon nanotubes.

Of further relevance to this invention is the literature on electric field-assisted sintering, which is also known as spark plasma sintering, plasma activated sintering, and field-assisted sintering technique. Electric field-assisted sintering is disclosed in the literature for use on metals and ceramics, for consolidating polymers, for joining metals, and for crystal growth and promoting chemical reactions. The densification of alumina powder by electric field-assisted sintering is disclosed by Wang, S. W., et al., *J. Mater. Res.* 15(4) (April 2000): 982–987.

SUMMARY OF THE INVENTION

It has now been discovered that a ceramic material of unusually high fracture toughness and favorable mechanical properties in general is achieved by combining single-wall carbon nanotubes with nano-sized ceramic particles and consolidating the resulting mixture into a continuous mass by electric field-assisted sintering. The invention is illustrated by alumina as a representative ceramic material, and the resulting single-wall carbon nanotube-reinforced alumina possesses a toughness that is nearly three times the toughness of pure nanocrystalline alumina prepared in the same manner. The composite is also superior to composites formed with multi-wall carbon nanotubes, despite the fact that full density can be achieved both with ceramics sintered with single-wall carbon nanotubes and with ceramics sintered with multi-wall carbon nanotubes. This discovery that single-wall carbon nanotubes offer a significant improvement relative to multi-wall carbon nanotubes is thus a further aspect of this invention not recognized in the prior art. A still further discovery is that ceramic nanocomposites prepared by the process of this invention are at least equal if not superior in mechanical properties to ceramic nanocomposites that contain iron in addition to the carbon nanotubes. Electric field-assisted sintering itself offers advantages to the process by producing a fully dense product with superior mechanical properties in much less processing time than other sintering methods. This unique combination of the use of single-wall carbon nanotubes and electric field-assisted sintering produces a ceramic nanocomposite with the highest fracture toughness reported to date.

These and other features, advantages and objects of this invention will be apparent from the description that follows. All literature references cited in this specification are incorporated herein by reference for their descriptions of the subject matter in the contexts of which the citations are made.

DETAILED DESCRIPTION OF THE INVENTION AND PREFERRED EMBODIMENTS

Figure 1:
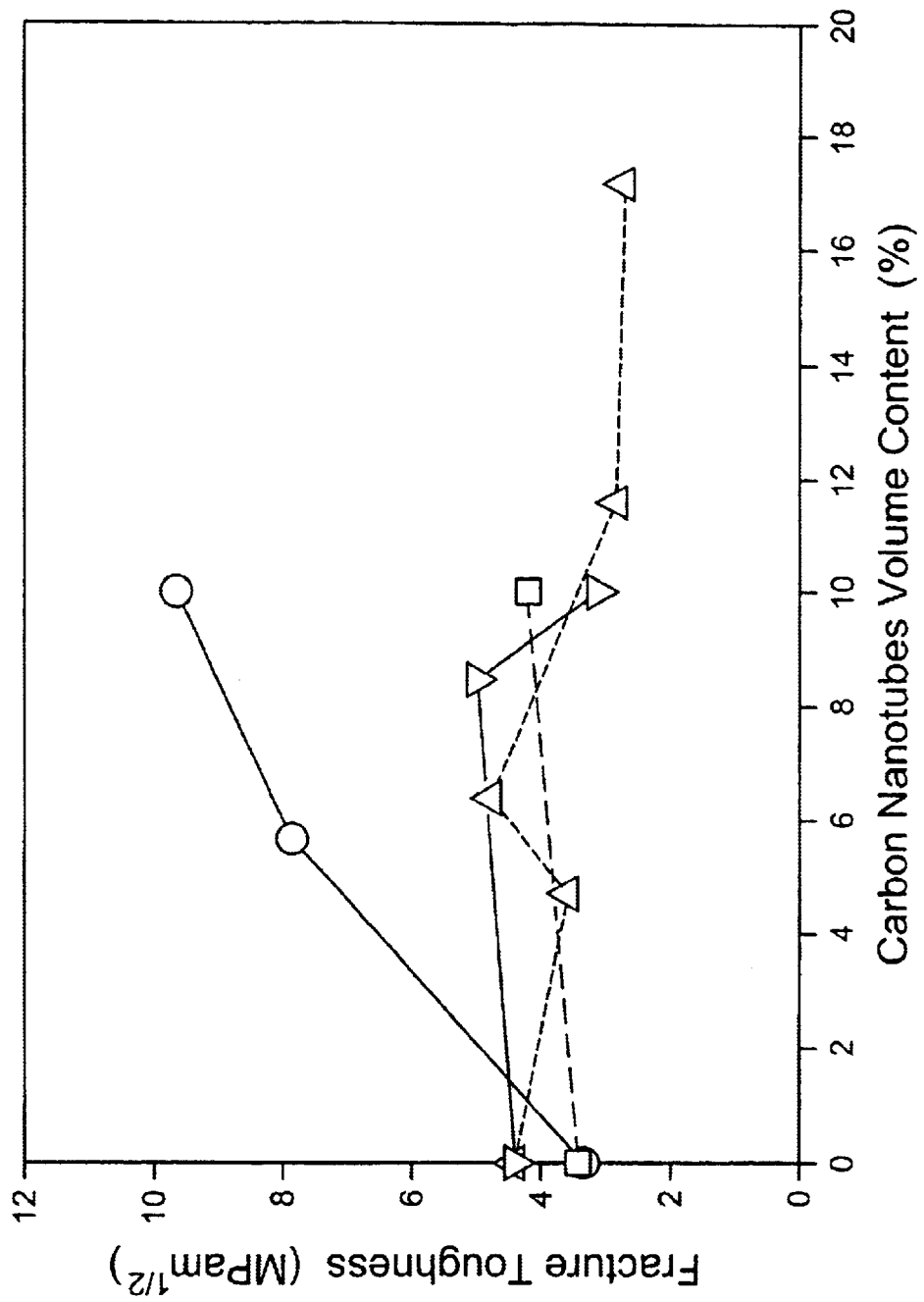
FIG. 1 is a plot of fracture toughness of sintered alumina vs. amount of carbon nanotubes incorporated into the alumina, listing test results generated by the inventors herein together with test results reported in the literature.

Carbon nanotubes are polymers of pure carbon. Both single-wall and multi-wall carbon nanotubes are known in the art and the subject of a considerable body of published literature. Examples of literature on the subject are Dresselhaus, M. S., et al., *Science of Fullerenes and Carbon Nanotubes*, Academic Press, San Diego (1996), and Ajayan, P. M., et al., "Nanometre-Size Tubes of Carbon," *Rep. Prog. Phys.* 60 (1997): 1025–1062. The structure of a single-wall carbon nanotube can be described as a single graphene sheet rolled into a seamless cylinder whose ends are either open or closed. When closed, the ends are capped by either half fullerenes or more complex structures including pentagons. The average diameter of a single-wall carbon nanotube is within the range of 0.5 to 100 nm, and more typically, 0.5 to 10 nm, 0.5 to 5 mn, or 0.7 to 2 nm. The aspect ratio, i.e., length to diameter, can range from about 25 to about 1,000,000, and preferably from about 100 to about 1,000. Thus, a nanotube of 1 nm diameter may have a preferred length of from about 100 to about 1,000 nm. (All ranges stated herein are approximate.) Nanotubes frequently exist as "ropes," or bundles of 10 to 100 nanotubes held together along their length by van der Waals forces, with individual nanotubes branching off and joining nanotubes of other "ropes." Multi-walled carbon nanotubes are multiple concentric cylinders of graphene sheets. The cylinders are of successively larger diameter to fit one inside another, forming a layered composite tube bonded together by van der Waals forces, with a typical distance of approximately 0.34 nm between layers, as reported by Peigney, A., et al., "Carbon nanotubes in novel ceramic matrix nanocomposites," *Ceram. Inter.* 26 (2000) 677–683.

Carbon nanotubes are commonly prepared by arc discharge between carbon electrodes in an inert gas atmosphere. The product is generally a mixture of single-wall and multi-wall nanotubes, although the formation of single-wall nanotubes can be favored by the use of transition metal catalysts such as iron or cobalt. Single-wall nanotubes can also be prepared by laser ablation, as disclosed by Thess, A., et al., "Crystalline Ropes of Metallic Carbon Nanotubes," *Science* 273 (1996): 483–487, and by Witanachchi, S., et al., "Role of Temporal Delay in Dual-Laser Ablated Plumes," *J. Vac. Sci. Technol. A* 3 (1995): 1171–1174. A further method of producing single-wall nanotubes is the HiPco process, as disclosed by Nikolaev, P., et al., "Gas-phase catalytic growth of single-walled carbon nanotubes from carbon monoxide," *Chem. Phys. Lett.* 313, 91–97 (1999); and by Bronikowski M. J., et al., "Gas-phase production of carbon single-walled nanotubes from carbon monoxide via the HiPco process: A parametric study," *J. Vac. Sci. Technol.* 19, 1800–1805 (2001).

The ceramic materials that form the major component of the composites of this invention include any known ceramics, although preferred ceramics are metal oxides. Examples of metal oxide ceramics are alumina, magnesium oxide, magnesia spinel, titania, cerium oxide, yttria, and zirconia. Further examples are combinations of two or more of these metal oxides, and combinations that include other oxides such as silica and other metal and non-metal oxides, as well as mixed metallic oxides such as SiAlON, AlON, spinels, and calcium aluminate. A metal oxide that is currently of particular interest is alumina, including both $\alpha$- and $\gamma$-alumina.

The starting materials for the nanocomposites of this invention are preferably powder mixtures of the ceramic and the single-wall carbon nanotubes. It is preferred that the mixtures, and the final product as well, be free of multi-wall carbon nanotubes, or if multi-wall carbon nanotubes are present, that the amount of multi-wall nanotubes relative to the amount of single-wall nanotubes be so small that the presence of the multi-wall nanotubes does not obliterate or significantly reduce the beneficial properties attributable to the single-wall nanotubes. It is also preferred that the nanocomposites be free of iron or contain no more than a negligible amount that will not affect the properties of the product.

The relative amounts of ceramic material and single-wall carbon nanotubes can vary, although the mechanical properties and possibly the performance characteristics may vary with the proportion of single-wall carbon nanotubes present. In most cases, best results will be achieved with nanocomposites in which the single-wall carbon nanotubes constitute from about 1% to about 50% by volume of the starting powder mixture, and preferably from about 3% to about 25% by volume. The volume percents referred to herein are measured on the bulk starting material, i.e., the volumes of non-consolidated powders.

The ceramic material used as a starting material is preferably in the form of nano-sized particles, i.e., particles whose diameters are less than 100 nm in diameter on the average, and preferably from about 10 nm to about 90 nm on the average. The single-wall carbon nanotubes can be dispersed through the ceramic powder by conventional means to form a uniformly dispersed powder mixture, although a preferred method is one involving the use of suspensions of the two materials in a liquid suspending medium. The ceramic powder and the carbon nanotubes can thus be suspended in separate volumes of a low molecular weight alcohol (ethanol, for example), followed by combining of the two suspensions. Carbon nanotubes are available from commercial suppliers in a paper-like form, and can be dispersed in ethanol and other liquid suspending agents with the assistance of ultrasound.

Once the mixture of ceramic powder and single-wall carbon nanotubes is formed, the mixture is preferably mixed prior to electric field-assisted sintering. Mechanical mixing can be performed by ball-milling in conventional rotary mills that mix the powder mixture with the assistance of tumbling balls. The sizes of the balls, the number of balls used per unit volume of powder, the rotation speed of the mill, the temperature at which the milling is performed, and the length of time that milling is continued can all vary widely. Best results will generally be achieved with a milling time ranging from about 4 hours to about 50 hours. The degree of mixing may also be affected by the "charge ratio," which is the ratio of the mass of the balls to the mass of the powder. A charge ratio of from about 5 to about 20 will generally provide proper mixing. The milling can be performed on the powders while suspended in the liquid suspending agent referred to above.

Electric field-assisted sintering is performed by passing a pulsewise DC electric current through the powder mixture while pressure is applied. A description of this method and of apparatus in which the method can be applied is presented by Wang, S. W., et al., "Densification of $Al_2O_3$ powder using spark plasma sintering," *J. Mater. Res.* 15(4), 982–987 (2000). While the conditions may vary, best results will generally be obtained with a densification pressure exceeding 10 MPa, preferably from about 10 MPa to about 200 MPa, and most preferably from about 40 MPa to about 100 MPa. The preferred current is a pulsed DC current of from about 250 $A/cm^2$ to about 10,000 $A/cm^2$, most preferably from about 500 $A/cm^2$ to about 1,500 $A/cm^2$. The duration of the pulsed current will generally range from about 1 minute to about 30 minutes, and preferably from about 1.5 minutes to about 5 minutes. Preferred temperatures are within the range of from about 800° C. to about 1,500° C., and most preferably from about 900° C. to about 1,400° C. Densification is typically performed by isostatic compression under an inert gas atmosphere, and preferred gas pressures for the densification are within the range of from about 0.01 Torr to about 10 Torr, and most preferably from about 0.03 Torr to about 1.0 Torr.

The term "nanocomposite" as used herein is intended to include composites whose grain sizes are in the nano-size range, i.e., less than 100 nm in diameter, as well as composites formed from powders in the nano-size range that have undergone limited grain growth during sintering. Accordingly, certain nanocomposites referred to herein will have grain sizes that exceed the nano-size range by as much as 500 nm due to the grain growth.

The following example is offered for purposes of illustration and is not intended to limit the scope of the invention.

EXAMPLE

Materials, Equipment, and Experimental Procedures

Purified single-wall carbon nanotubes produced by a continuous catalytic process with more than 90% of the catalyst removed were obtained from Carbon Nanotechnologies Incorporated (Houston, Tex., USA). The nanotubes were obtained in paper form, and once obtained were dispersed in ethanol with the assistance of ultrasound. The ceramic material used was a mixture of alumina powders consisting of 80% $\alpha$-$Al_2O_3$ and 20% $\gamma$-$Al_2O_3$ with particle sizes of 300 nm (40 nm crystallite size) and 20 nm respectively, obtained from Baikowski International Corporation (Charlotte, N.C., USA). The alumina powder was added to the alcohol suspension of the carbon nanotubes, and a portion of the alcohol was then removed. Separate mixtures representing 5.7 volume percent and 10 volume percent, respectively, of carbon nanotubes relative to total solids, were prepared in this manner. Each powder mixture, still suspended in ethanol, was then passed through a 200-mesh sieve and placed in milling jars with zirconia milling balls 5/16-inch in diameter at a charge ratio of 10. The jars were then placed on a rotary ball mill and milling was performed for 24 hours. All ethanol was then removed by evaporation while the temperature was maintained below 70° C.

Each milled powder mixture was placed on a graphite die of inner diameter 20 mm and cold-pressed at 200 MPa. The cold-pressed powder mixtures were then sintered on a Dr. Sinter 1050 Spark Plasma Sintering System (Sumitomo Coal Mining Company, Japan) under vacuum. Electric field-assisted sintering was then performed at an applied pressure of 63 MPa with a pulsed DC current of 5,000 A maximum and a maximum voltage of 10 V, with a pulse duration time of 12 ms separated by intervals of 2 ms. Once the pressure was applied, the samples were heated to 600° C. in 2 minutes and then raised to 1,150° C. for 3 minutes at a heating rate of 550° C./min. The temperature was monitored with an optical pyrometer focused on a depression in the graphite die measuring 2 mm in diameter and 5 mm in depth.

The final densities of the sintered compacts were measured by the Archimedes method using deionized water as the immersion medium. The density of the single-wall carbon nanotubes used as a starting material was 1.8 $g/cm^3$. Microstructure determinations of the sintered compacts were performed with an FEI XL30-SFEG high-resolution scanning electron microscope with a resolution better than 2 nm and magnification of greater than 600 k. Grain sizes were estimated by high-resolution scanning electron microscope of fractured surfaces. Indentation tests were performed on a Wilson Tukon hardness tester with a diamond Vickers indenter. Bulk specimens were sectioned and mounted in epoxy, then polished through 0.25-micron diamond paste. The indentation parameters for fracture toughness ($K_{IC}$) were a 2.5 kg load with a dwell time of 15 s. The fracture toughness was calculated by the Anstis equation as disclosed by Anstis, G. R., et al., "A Critical Evaluation of Indentation Techniques for Measuring Fracture Toughness: I, Direct Crack Measurement," *J. Am. Ceram. Soc.* 64(9): 533–538 (1981).

In addition to the 5.7% and 10% (by volume) single-wall carbon nanotube composites, pure alumina was processed in parallel manner for comparison. The results were also compared with data from the literature representing composites prepared by methods of the prior art. All such results are presented below.

Results

The sintered materials whose preparation is described above are listed in Table I together with nanocomposites selected from the prior art as representative of the state of the art preceding this invention. For each entry, the table lists composition, expressed in terms of components and volume percents of each; the sintering method, expressed as either electric field-assisted sintering or hot pressing, together with the temperature reached and the amount of time at that temperature; the relative density; the grain size of the sintered product; the fracture toughness; and the source of the data, i.e., either the inventors herein or the literature citation. To obtain the relative density, the theoretical density is first calculated as the total of the densities of the components multiplied by their volume percents, and the measured density is then expressed as a percent of the theoretical density. In this Table, "SWCN" denotes single-wall carbon nanotubes, "MWCN" denotes multi-wall carbon nanotubes, "SPS" denotes spark plasma sintering (i.e., electric field-assisted sintering), and "HP" denotes hot pressing (i.e., sintering in the absence of an electric field).

TABLE I

Compositions, Processing Conditions and Relative Densities of SWCN-Reinforced Alumina vs. Pure Alumina

| Composition (additive volume %; balance Al$_2$O$_3$) | Processing Conditions | Relative Density (%) | Grain Size (nm) | Fracture Toughness (MPam$^{1/2}$) | Source |
|---|---|---|---|---|---|
| 0% (pure Al$_2$O$_3$) | SPS/1, 150° C./3 min | 100 | 349 | 3.3 | herein |
| 5.7% SWCN | SPS/1, 150° C./3 min | 100 | 200 | 7.9 | herein |
| 10% SWCN | SPS/1, 150° C./3 min | 100 | 200 | 9.7 | herein |
| 10% MWCN | HP/1, 300° C./60 min | 100 | ~500 | 4.2 | (i) |
| 6.4% SWCN; 2.5% Fe | HP/1, 475° C./15 min | 91 | ~500 | 4.8 | (ii) |
| 11.6% SWCN; 2.5% Fe | HP/1, 475° C./15 min | 97.5 | ~500 | 2.8 | (ii) |
| 4.7% SWCN; 5.3% Fe | HP/1, 475° C./15 min | 97.8 | ~500 | 3.6 | (ii) |
| 17.2% SWCN; 5.0% Fe | HP/1, 500° C./15 min | 99.2 | ~500 | 2.7 | (ii) |
| 8.5% SWCN; 4.3% Fe | HP/1, 500° C./15 min | 88.7 | 300 | 5.0 | (iii) |
| 10% SWCN; 4.3% Fe | HP/1, 500° C./15 min | 87.5 | 300 | 3.1 | (iii) |

(i) Siegel, R. W., et al., "Mechanical Behavior of Polymer and Ceramic Matrix Nanocomposites," Scripta Mater. 44: 2061–2064 (2001)
(ii) Peigney, A., et al., "Carbon Nanotubes in Novel Ceramic Matrix Nanocomposites," Ceram. Inter. 26: 677–683 (2000)
(iii) Flahaut, E., et al., "Carbon Nanotubes-Metal-Oxide Nanocomposites: Microstructure, Electrical Conductivity, and Mechanical Properties," Acta Mater. 48: 8303–3812 (2000)

The fracture toughness data is also shown in FIG. 1, in which the fracture toughness is plotted vs. the volume percent of carbon nanotubes for each of the data entries in the Table. The symbols used in FIG. 1 are: circles for the data generated by the inventors herein, squares for the data taken from Siegel et al., triangles tapering at the top for the data taken from Peigney et al., and triangles tapering at the bottom for the data taken from Flahaut et al.

Comparison of the relative density values in the second and third rows in Table I (the data representing the present invention) with the relative density in the first row (and a comparison of the circles in FIG. 1) indicates that the SWCN-containing nanocomposites sintered by electric field-assisted sintering were able to reach full density. This demonstrates that the addition of SWCN had no adverse effect on the densification. Comparison of the grain sizes among the various entries shows that the grain growth was considerably lower in the second and third samples than in the others, all of which used nano-scale powders as starting materials. The smallest final grain size in the prior art entries was about 300 nm, but this was obtained at the expense of density, which was only 88.7% of the theoretical density (ninth row of data). The only other full-density sample was that achieved with multi-wall carbon nanotubes (fourth row of data) but the grain size grew to 500 nm.

The microstructures observed by high-resolution scanning electron micrograph of fractured surfaces for the composites shown in the second and third rows of the table showed that the carbon nanotubes were homogeneously dispersed through the alumina matrix in both cases, although some agglomerations were observed in the 10% sample. Fracture surfaces were textured and rough in both nanocomposites. No separation of the carbon nanotubes was observed. Instead, the nanotube ropes were entangled with the alumina grains to form a network structure. This has not been observed in the prior art.

Comparison of the values in the fracture toughness column of the Table and in the FIGURE shows that for the samples within the scope of the present invention (the second and third rows in the Table), the fracture toughness significantly increases with an increase in the amount of single-wall carbon nanotubes present. The sample containing 10 volume percent SWCN exhibited a fracture toughness that was nearly three times that of pure nanocrystalline alumina (shown in the first row of the table). The 10% SWCN sample is also more than two and a half times tougher than a similar sample from the literature (Siegel et al.) with the same content but in multi-wall carbon nanotubes rather than single-wall (third row vs. fourth row) and obtained by hot-pressing rather than electric field-assisted sintering. In its own comparison with pure alumina, the Siegel et al. paper reports only a 24% increase, and other investigators, notably Laurent, C., et al., "Carbon Nanotubes-Fe-Alumina Nanocomposites. Part I: Influence of the Fe Content on the Synthesis of Powders," J. Euro. Ceram. Soc. 18: 2005–2013 (1998), report no toughening effect at all when carbon nanotubes are incorporated into Fe—Al$_2$O$_3$. In sharp contrast, the comparison performed by the inventors herein shows a 194% increase over pure alumina (third row vs. first row).

The foregoing is offered primarily for purposes of illustration and explanation. Further variations, modifications and substitutions that, even though not disclosed herein, still fall within the scope of the invention may readily occur to those skilled in the art.

What is claimed is:

1. A process for forming a high-performance ceramic material, said method comprising consolidating a mixture of ceramic particles of less than 100 nm in diameter and single-wall carbon nanotubes into a continuous mass by compressing said mixture while passing an electric current through said mixture.

2. A process in accordance with claim 1 in which said ceramic particles are metal oxide particles.

3. A process in accordance with claim 2 in which said metal oxide particles are a member selected from the group consisting of alumina, magnesium oxide, magnesia spinel, titania, cerium oxide, yttria, and zirconia.

4. A process in accordance with claim 2 in which said metal oxide particles are alumina.

5. A process in accordance with claim 1 in which said single-wall carbon nanotubes constitute from about 1% to about 50% by volume of said mixture.

6. A process in accordance with claim 1 in which said single-wall carbon nanotubes constitute from about 3% to about 25% by volume of said mixture.

7. A process in accordance with claim 1 comprising compressing said mixture at a pressure of from about 10 MPa to about 200 MPa and a temperature of from about 800° C. to about 1,500° C., and said electric current is a pulsed direct current of from about 250 A/cm$^2$ to about 10,000 A/cm$^2$.

8. A process in accordance with claim 1 comprising compressing said mixture at a pressure of from about 40 MPa to about 100 MPa and a temperature of from about 900° C. to about 1,400° C., and said electric current is a pulsed direct current of from about 500 A/cm$^2$ to about 5,000 A/cm$^2$.

9. A process for forming a high-performance alumina-containing ceramic material, said process comprising:

(a) forming a mixture of alumina powder and single-wall carbon nanotubes in which said single-wall carbon nanotubes constitute from about 4% to about 20% by volume of said mixture; and (b) consolidating mixture so activated into a continuous mass by compressing said mixture at a pressure of from about 40 MPa to about 100 MPa while exposing said mixture to a pulsed direct current of from about 500 A/cm$^2$ to about 5,000 A/cm$^2$.

* * * * *